United States Patent
Rensing

(10) Patent No.: US 11,523,591 B2
(45) Date of Patent: Dec. 13, 2022

(54) DEVICE HAVING A GRID FLOOR FOR POULTRY REARING

(71) Applicant: Hans-Jürgen Fienhage, Goldenstedt (DE)

(72) Inventor: Frank Rensing, Visbek (DE)

(73) Assignee: Hans-Jürgen Fienhage, Goldenstedt (DE)

( * ) Notice: Subject to any disclaimer, the term of this patent is extended or adjusted under 35 U.S.C. 154(b) by 0 days.

(21) Appl. No.: 16/952,179

(22) Filed: Nov. 19, 2020

(65) Prior Publication Data
US 2021/0144973 A1    May 20, 2021

(30) Foreign Application Priority Data

Nov. 20, 2019   (DE) .......................... 102019008050.5

(51) Int. Cl.
*A01K 31/18* (2006.01)
*A01K 39/014* (2006.01)

(52) U.S. Cl.
CPC ............ *A01K 31/18* (2013.01); *A01K 39/014* (2013.01); *A01K 2227/30* (2013.01)

(58) Field of Classification Search
CPC ... A01K 31/18; A01K 39/014; A01K 2227/30
See application file for complete search history.

(56) References Cited

U.S. PATENT DOCUMENTS

| | | | |
|---|---|---|---|
| 1,297,821 A | 3/1919 | Fleming | |
| 3,433,205 A * | 3/1969 | Pittard | A01K 39/01 119/57.2 |
| 3,777,710 A * | 12/1973 | Rhinehart | A01K 31/002 119/478 |
| 4,527,513 A * | 7/1985 | Hart | A01K 39/04 119/51.5 |
| 9,119,382 B2 * | 9/2015 | Foreman | B65G 61/00 |
| 10,251,372 B2 * | 4/2019 | Meter | A01K 39/012 |
| 10,750,727 B1 * | 8/2020 | Foreman | A01K 31/007 |
| 2010/0186428 A1 * | 7/2010 | Meter | F25D 17/042 362/249.02 |
| 2013/0255587 A1 * | 10/2013 | Kokenge | A01K 39/01 119/464 |
| 2018/0007870 A1 * | 1/2018 | Finco | A01K 31/22 |
| 2018/0213751 A1 * | 8/2018 | Baranes | A01K 31/18 |
| 2019/0021291 A1 * | 1/2019 | Meter | A01K 41/023 |

(Continued)

FOREIGN PATENT DOCUMENTS

| | | | |
|---|---|---|---|
| CA | 2935098 A1 * | 7/2017 | ............. A01K 31/18 |
| CN | 106743353 A * | 5/2017 | |

(Continued)

OTHER PUBLICATIONS

European Patent Office, Europaischer Recherchenbericht (search in a related application), dated Mar. 9, 2021.

(Continued)

*Primary Examiner* — Monica L Perry
*Assistant Examiner* — Aaron M Rodziwicz
(74) *Attorney, Agent, or Firm* — Laurence P. Colton; Smith Tempel Blaha LLC

(57) ABSTRACT

A device having a grid floor for accommodating young chicks in poultry rearing. A feed trough having openings in a side wall and for the passage of feed is provided.

13 Claims, 4 Drawing Sheets

(56) References Cited

U.S. PATENT DOCUMENTS

2019/0037798 A1* 2/2019 Maendel ............... A01K 31/007
2020/0383300 A1* 12/2020 Finco .................... A01K 31/22

FOREIGN PATENT DOCUMENTS

| | | | | |
|---|---|---|---|---|
| CN | 206932978 U | 1/2018 | | |
| CN | 109380151 A | * 2/2019 | | |
| CN | 111990289 A | * 11/2020 | | |
| DE | 202009008294 U1 | 11/2009 | | |
| DE | 202009017565 U1 | 5/2011 | | |
| DE | 202017002530 U1 | * 7/2017 | ............. | A01K 45/00 |
| EP | 3097778 A2 | * 11/2016 | ........... | A01K 31/002 |
| EP | 3097778 A2 | 11/2016 | | |
| EP | 3760040 A1 | * 1/2021 | ............. | A01K 31/18 |
| KR | 2019029391 A | * 3/2019 | | |
| WO | WO-2011133020 A1 | * 10/2011 | ............. | A01K 31/19 |
| WO | WO-2017125596 A1 | * 7/2017 | ............. | A01K 31/19 |

OTHER PUBLICATIONS

Deutsches Patent- Und Markenamt (German Patent and Trademark Office), Recherchebericht (search in a related application), dated Aug. 19, 2020.

* cited by examiner

DEVICE HAVING A GRID FLOOR FOR POULTRY REARING

CROSS REFERENCE TO RELATED APPLICATIONS

This patent application claims the benefit of and priority on German Patent Application No. 10 2019 008 050.5 having a filing date of 20 Nov. 2019.

BACKGROUND OF THE INVENTION

Technical Field

The invention relates to a device having a grid floor for accommodating young chicks in poultry rearing. In particular, the chicks are chicks aged from one to fourteen days, including so-called day-old chicks, and chicks for laying hens are preferably reared. The invention relates further to a housing arrangement and to a poultry house.

Prior Art

In a poultry house for the rearing of laying hens, the chicks are kept at multiple levels on grid floors. A manure belt is generally arranged beneath each grid floor. Drink dispensers are provided above the grid floors. Feed is made available in a feed trough which is open at the top.

For chicks, grid floors with a small mesh size are provided so that the chicks do not fall through the mesh onto the manure belt. Young chicks, in particular day-old chicks, are generally too small or too weak to take feed from a feed trough. Heaps of feed are therefore made available on paper underlays. Feeding of the chicks is very labor-intensive as a result.

BRIEF SUMMARY OF THE INVENTION

The object of the present invention is to provide a device for accommodating chicks with which the administration of feed is less labor-intensive.

In order to achieve the object, a device having a grid floor for accommodating young chicks in poultry rearing, comprising a feed trough having openings in a side wall and for the passage of feed. In particular, the grid floor has a feed trough having openings in a side wall and for the passage of feed. The feed passes through the openings onto the level of the grid floor. Typically, the feed for freshly hatched chicks within the first ten to fourteen days is relatively dry and is therefore capable of scattering. The feed is therefore able to escape from the feed trough through the lateral openings. The fill level of the feed in the feed trough simply has to be high enough. The feed trough is preferably positioned on the grid floor or adjacent thereto.

Typically, the feed trough extends over the entire length of the house, or over the length of a housing arrangement. Preferably, approximately two openings are provided per meter of feed trough length. The diameter of the openings is adapted to the feed. Tests with conventional feed have shown that openings with a diameter of approximately 7.5 mm are very suitable.

According to a further concept of the invention, a scratching plate or other underlay for catching the feed can be provided beneath an opening for the passage of feed. Preferably, the underlay or scratching plate is provided beneath each opening. The feed lands on the underlay/scratching plate, where it is picked up by the chicks. The chicks can satisfy their natural need to scratch on the scratching plate, thus become stronger, and the scratching plate remains relatively clean. The scratching plate/underlay can be changed quickly if required and is located in particular on the grid floor.

According to a further concept of the invention, the scratching plate can lie with one edge against the side wall of the feed trough without any distance between them. Feed falling from the opening thus lands without fail on the scratching plate. Preferably, the scratching plate is rectangular or square, for example with dimensions of 22 cm×22 cm or 25 cm×25 cm.

The scratching plate can be produced from plastics material or metal. A plastics scratching plate is perceived as warmer by the chicks.

According to a further concept of the invention, the scratching plate can have a flat upper side with protuberances. The protuberances are preferably round, approximately 1 cm high and 1 cm in diameter.

According to a further concept of the invention, the feed trough can be provided with a feed conveyor which conveys the feed in the longitudinal direction of the feed trough. In particular, the feed conveyor is a revolving feed chain. The feed can thus be supplied in a largely automated manner. Owing to the movement, the feed passes better through the lateral openings.

According to a further concept of the invention, the feed trough can be provided on its open upper side with a chick protective insert. The chick protective insert has successive open regions in the longitudinal direction of the feed trough, the dimensions of which regions are such that older chicks reach the feed with their beaks. However, the open regions should not be so large that the chicks fall through. Instead, the open regions can be separated from one another by web portions. The web portions can be arranged offset downwards relative to upper edges of side walls of the feed trough. The distance to the feed is then smaller.

The invention also provides a housing arrangement for poultry rearing, having a device as disclosed herein. The housing arrangement generally has different floors at multiple levels.

The invention also provides a poultry house having a device according to the invention or a housing arrangement according to the invention.

Further features of the invention will become apparent from the remainder of the description and from the patent claims.

BRIEF DESCRIPTION OF THE DRAWINGS

Advantageous exemplary embodiments of the invention will be explained in greater detail hereinbelow with reference to drawings, in which:

FIG. 4 shows the detail according to FIG. 2 with concealed lines partially drawn in.

DETAILED DESCRIPTION OF PREFERRED EMBODIMENTS

Figure 1:
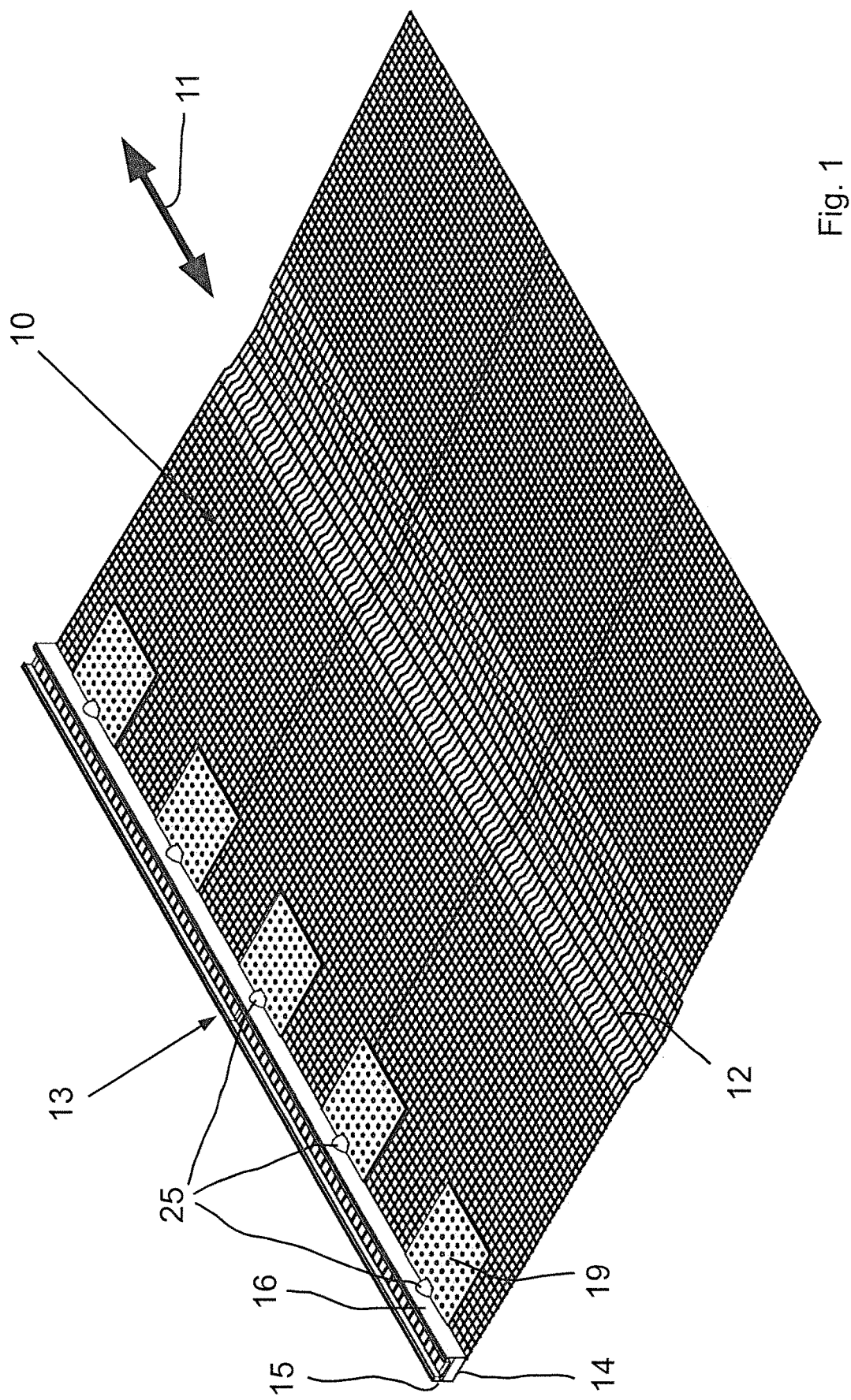
FIG. 1 is a perspective plan view of a grid floor having a feed trough.
Figure 2:
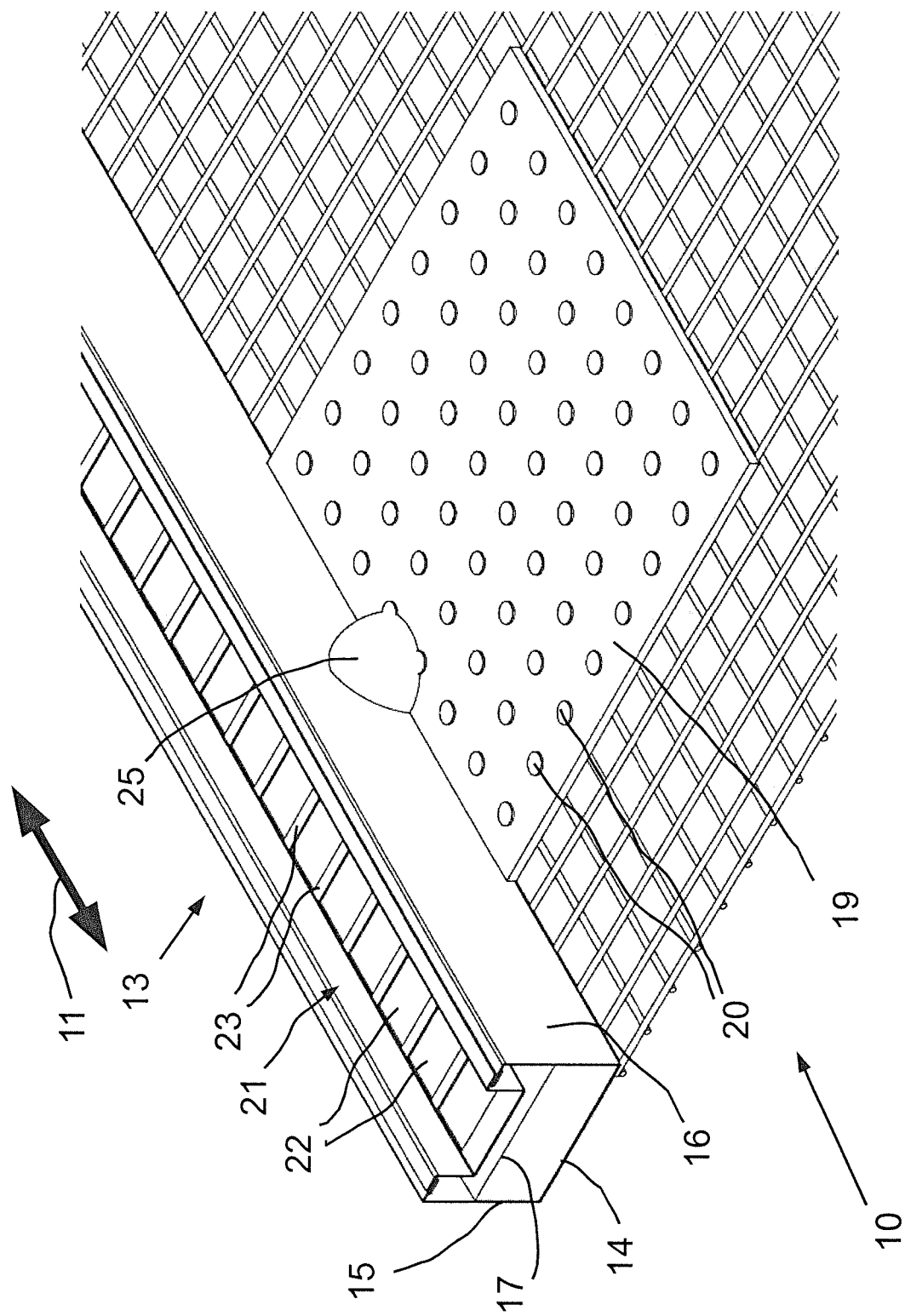
FIG. 2 shows a detail of FIG. 1.
Figure 3:
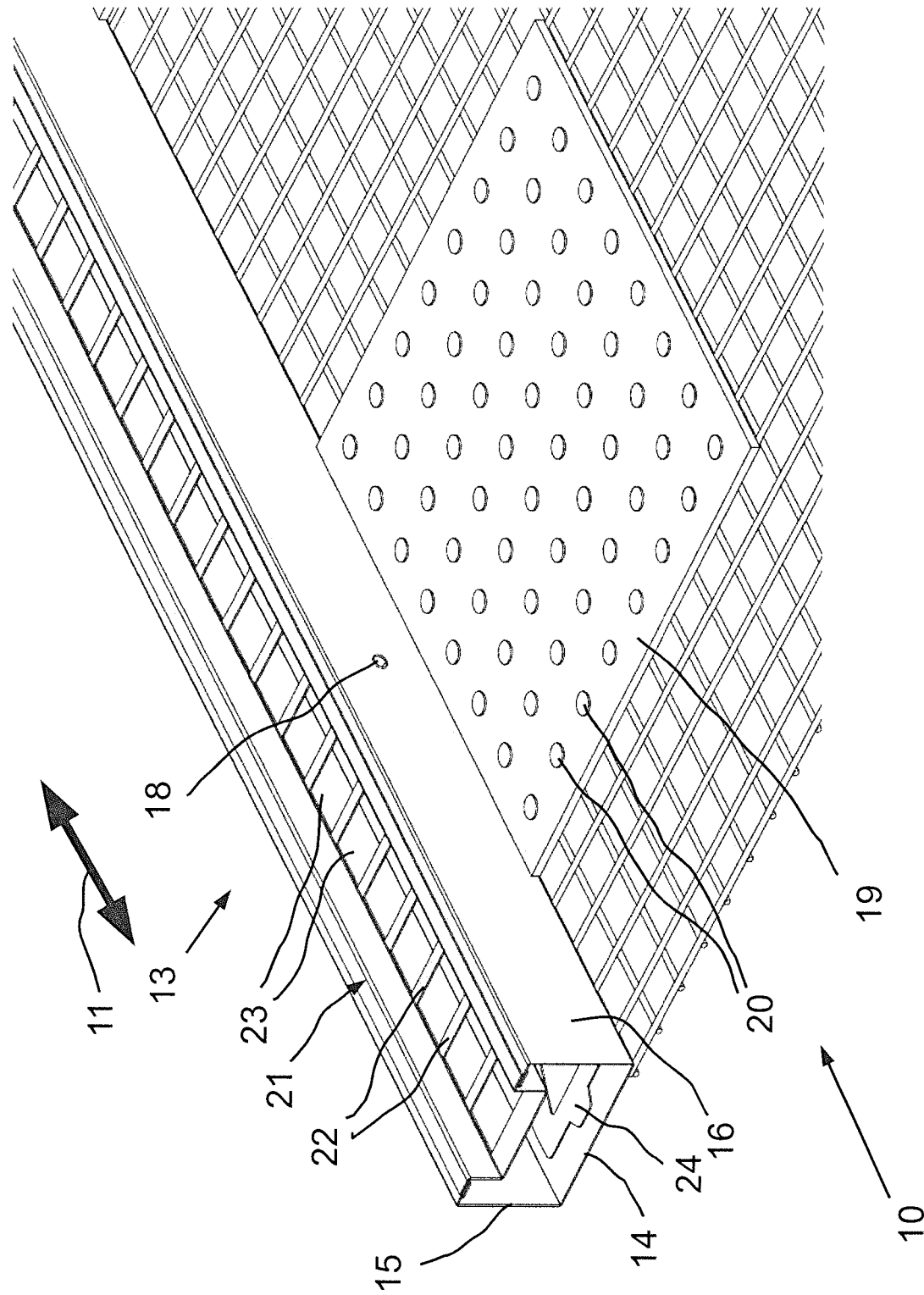
FIG. 3 shows the detail according to FIG. 2, but without feed.
Figure 4:
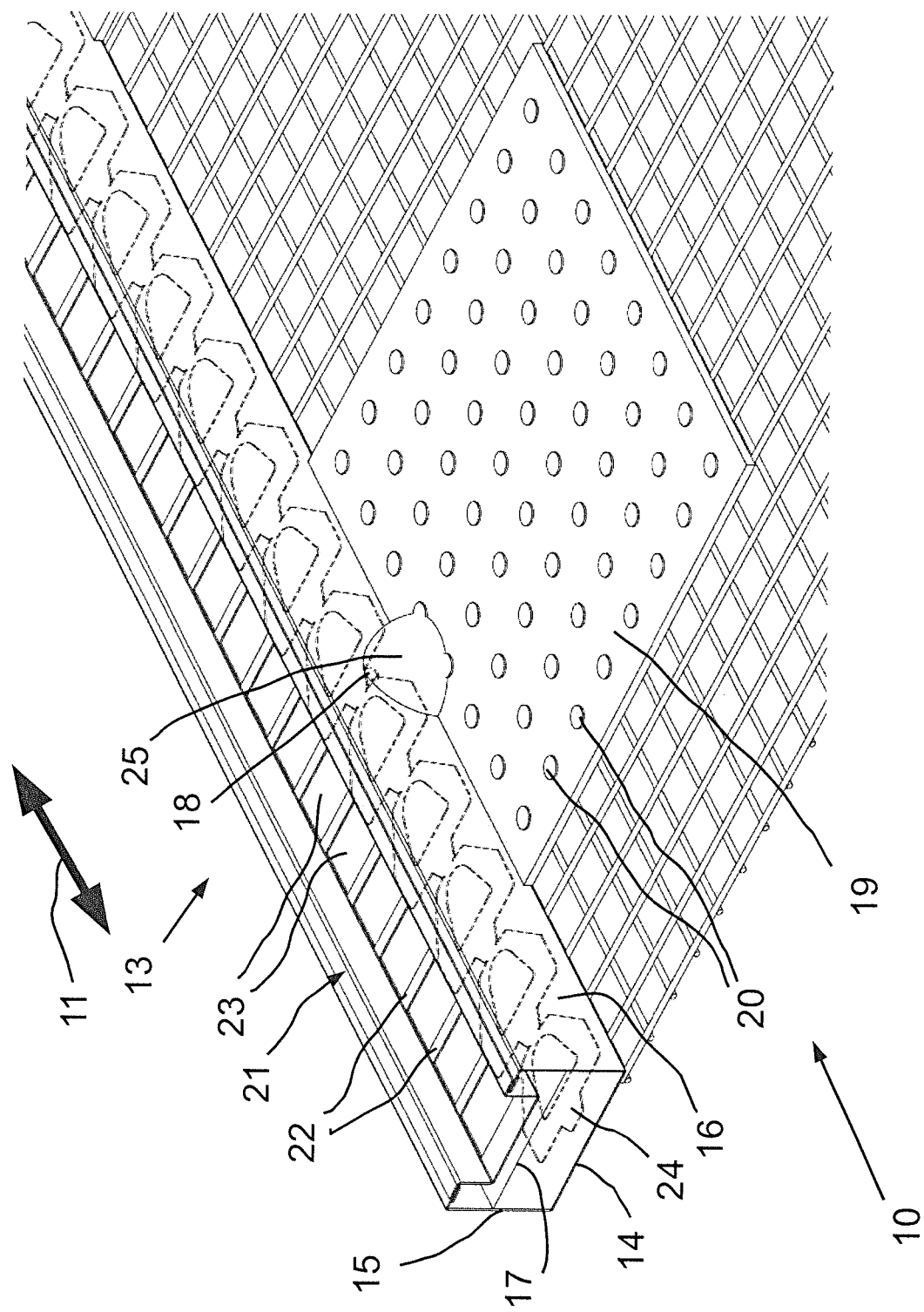

FIG. 1 shows a grid floor 10 for poultry rearing. Specifically, it is a grid floor 10 suitable for rearing freshly hatched chicks, with a correspondingly small mesh size of, for example, 19 mm. The grid floor 10 is rectangular. In a poultry house, a plurality of grid floors 10 are arranged one behind the other in the longitudinal direction—arrow 11.

Approximately in the middle, the grid floor 10 can have an egg region 12 extending in the longitudinal direction 11. This is advantageous at least when laying hens can also reach the grid floor 10. Preferably, the grid floor 10 is configured to be inclined slightly towards the egg region 12 on both sides.

At the edge, the grid floor 10 has a feed trough 13 extending in the longitudinal direction 11. In a poultry house, the feed trough extends over a plurality or all of the grid floors arranged one behind the other. Preferably, a feed trough 13 is provided at both edges of the grid floor 10 (not shown).

The feed trough 13 has a bottom wall 14, an outer side wall 15 remote from the grid floor 10, and an inner side wall 16 facing the grid floor 10. Feed is located in the feed trough 13 up to a height which is here referred to as the feed level 17.

The inner side wall 16 has successive individual holes 18 in the longitudinal direction 11, from which holes feed 25 can escape from the feed trough 13 to the grid floor 10. The holes are arranged approximately at intervals of 0.5 m and have a diameter which is adapted to the grain size and moistness of the feed. A diameter of approximately 7.5 mm has been found to be advantageous. The feed level 17 is above the height of the holes 18. The holes 18 are thereby arranged at a distance from the bottom wall 14. The distance is approximately from 1 cm to 2 cm (from the upper side of the bottom wall 14 to the lower edge of the hole 18).

Beneath each hole 18, a scratching plate 19 is arranged on the grid floor 10. The scratching plate 19 preferably consists of plastics material, is rectangular and lies against the feed trough 13 without any distance between them. The feed 25 escaping from the hole 18 lands on the scratching plate, where it can be picked up by chicks which are still too small or too weak to feed from the feed trough 13.

The scratching plate 19 is so configured that it encourages the chicks' natural need to scratch. As a result, the scratching plate is self-cleaning. Droppings and feed residues fall downwards through the meshes in the grid floor 10 onto a manure belt, not shown. As a result of the opportunity to scratch, the chicks become stronger. The chick droppings remain in the poultry house for a shorter time, since they are conveyed away via the manure belt. Pollution by ammonia fumes is also reduced.

Preferably, the scratching plates 19 have protuberances 20 on their upper side, which protuberances fulfil the chicks' need to scratch. In particular, they are round protuberances approximately 1 mm in height and 10 mm in diameter.

The upper side, which is open at the top, of the feed trough 13 is here covered by a chick protective grid 21. This is configured to be recessed slightly into the feed trough 13 and has transverse web portions 22 with open regions 23 located between them. Stronger or older chicks are able to feed from the feed trough 13. The open regions 13 are so configured that the chicks are able to reach the feed with their beaks.

In the feed trough 13 there is provided a revolving feed chain 24 with which the feed can be conveyed along the feed trough 13. As a result, feed continuously arrives at the holes 18 and the scratching plates 19.

As soon as the chicks are approximately ten to fourteen days old, the feed can be changed. The chicks are then capable of feeding from the feed trough 13. The feed level 17 is lowered to below the holes 18. The scratching plates 19 can be removed or can remain.

LIST OF REFERENCE NUMERALS 10 grid floor
11 longitudinal direction arrow
12 egg collecting region
13 feed trough
14 bottom wall
15 outer side wall
16 inner side wall
17 feed level
18 holes
19 scratching plates
20 protuberances
21 chick protective grid
22 web portions
23 open regions
24 feed chain
25 feed

What is claimed is:

1. A device for accommodating young chicks in poultry rearing, the device comprising:
    a grid floor (10), the grid floor (10) extending in a longitudinal direction (11); and
    a feed trough (13) extending in the longitudinal direction (11) along an edge of the grid floor (10), the feed trough (13) having a bottom wall (14) and a side wall (16) extending in the longitudinal direction (11) and along the edge of the grid floor (10), the side wall (16) having openings (18) located laterally along the side wall (16) and arranged at a distance above the bottom wall (14) for the passage of feed (25) through the openings (18) from the feed trough (13) to the grid floor (10),
    wherein the openings (18) are positioned in the side wall (16) such that the feed (25) passes out of the feed trough (13) through the openings (18) towards the grid floor (10).

2. The device as claimed in claim 1, further comprising a scratching plate (19) or other underlay on the grid floor (10) for catching the feed (25) beneath at least one of the openings (18) in the side wall (16).

3. The device as claimed in claim 2, wherein the scratching plate (19) lies against the side wall (16) of the feed trough without any distance between them.

4. The device as claimed in claim 2, wherein the scratching plate (19) has a flat upper side with protuberances (20).

5. The device as claimed claim 1, further comprising a feed conveyor (24) within the feed trough (13) which conveys the feed (25) in the longitudinal direction (11) of the feed trough (13).

6. The device as claimed in claim 5, wherein the feed conveyor (24) is a revolving feed chain.

7. The device as claimed in claim 1, wherein the feed trough (13) further comprises an open upper side, and the feed trough (13) is provided on the open upper side with a chick protective insert (21).

8. A housing arrangement for poultry rearing, having a device for accommodating young chicks in poultry rearing, the device comprising:
    a grid floor (10); and
    a feed trough (13) having a bottom wall (14) and a side wall (16) along an edge of the grid floor (10), the side wall (16) having openings (18) i-R located laterally along the side wall (16) and arranged at a distance above the bottom wall (14) for the passage of feed (25) through the openings (18) from the feed trough (13) to the grid floor (10), the grid floor (10) and the feed trough (13) extending in a common longitudinal direction (11),
   wherein the openings (18) are positioned in the side wall (16) such that the feed (25) passes out of the feed trough (13) through the openings (18) towards the grid floor (10).

9. The housing arrangement as claimed claim 8, further comprising a feed conveyor (24) within the feed trough (13) which conveys the feed (25) in the longitudinal direction (11) of the feed trough (13).

10. The housing arrangement as claimed in claim 9, wherein the feed conveyor (24) is a revolving feed chain.

11. A poultry house having a device for accommodating young chicks in poultry rearing, the device comprising:
   a grid floor (10) and a feed trough (13), the feed trough (13) having a bottom wall (14) and a side wall (16) along an edge of the grid floor (10), the side wall (16) having openings (18) located laterally along the side wall (16) and arranged at a distance above the bottom wall (14) for the passage of feed (25) through the openings (18) from the feed trough (13) to the grid floor (10), the grid floor (10) and the feed trough (13) extending in a common longitudinal direction (11); or
   a housing arrangement having a grid floor (10) and a feed trough (13), the feed trough (13) having a bottom wall (14) and a side wall (16) having openings (18) located laterally along the side wall (16) and arranged at a distance above the bottom wall (14) for the passage of feed (25) through the openings (18) from the feed trough (13) to the grid floor (10), the grid floor (10 and the feed trough (13) extending in the common longitudinal direction (11),
   wherein the openings (18) are positioned in the side wall (16) such that the feed (25) passes out of the openings (18) towards the grid floor (10).

12. The poultry house as claimed claim 11, further comprising a feed conveyor (24) within the feed trough (13) which conveys the feed (25) in the longitudinal direction (11) of the feed trough (13).

13. The poultry house as claimed in claim 12, wherein the feed conveyor (24) is a revolving feed chain.

* * * * *